(12) United States Patent
Nam et al.

(10) Patent No.: US 11,649,788 B2
(45) Date of Patent: May 16, 2023

(54) FAILURE DIAGNOSIS METHOD AND SYSTEM OF DUAL PURGE SYSTEM

(71) Applicants: Hyundai Motor Company, Seoul (KR); Kia Corporation, Seoul (KR)

(72) Inventors: Young-Sun Nam, Seoul (KR); Hee-Nam Woo, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/495,033

(22) Filed: Oct. 6, 2021

(65) Prior Publication Data

US 2022/0364531 A1 Nov. 17, 2022

(30) Foreign Application Priority Data

May 13, 2021 (KR) .................. 10-2021-0061913

(51) Int. Cl.
*F02M 25/08* (2006.01)
(52) U.S. Cl.
CPC ...... *F02M 25/0827* (2013.01); *F02M 25/089* (2013.01); *F02M 25/0809* (2013.01); *F02M 25/0818* (2013.01); *F02M 25/0836* (2013.01)
(58) Field of Classification Search
CPC ........... F02M 25/0827; F02M 25/0809; F02M 25/0818; F02M 25/0836; F02M 25/089
See application file for complete search history.

(56) References Cited

U.S. PATENT DOCUMENTS

| 9,957,924 | B2* | 5/2018 | Dudar | F02M 25/0809 |
| 10,760,532 | B1* | 9/2020 | Dudar | F02D 41/0032 |
| 10,815,937 | B2* | 10/2020 | Dudar | F02B 33/34 |
| 10,823,119 | B2* | 11/2020 | Eom | F02M 25/0836 |
| 10,859,012 | B2* | 12/2020 | Koo | F02M 25/0827 |
| 2016/0305352 | A1* | 10/2016 | Pursifull | F02D 41/0045 |
| 2020/0386193 | A1* | 12/2020 | Dudar | F02B 37/18 |
| 2021/0388782 | A1* | 12/2021 | Idogawa | F02D 41/004 |

FOREIGN PATENT DOCUMENTS

KR 10-2020-0068795 A 6/2020
KR 10-2020-0118298 A 10/2020

* cited by examiner

*Primary Examiner* — Hung Q Nguyen
*Assistant Examiner* — Susan E Scharpf
(74) *Attorney, Agent, or Firm* — Morgan, Lewis & Bockius LLP

(57) ABSTRACT

A failure diagnosis method and a failure diagnosis system of a dual purge system may determine whether a closed stuck failure or an opened stuck failure occurs in a line forming a dual purge system by measuring a pressure in a negative pressure formation device and comparing the corresponding pressure with a predetermined reference value when a purge valve of the dual purge system is in an opened or closed state, and may determine whether the failure occurs in components related to a secondary purge line in the dual purge system in which it is difficult to determine whether the failure occurs in a conventional failure diagnosis method of a single purge system in a simple method.

16 Claims, 5 Drawing Sheets

| ITEM | Disconnect | Blockage |
|---|---|---|
| SECONDARY PURGE LINE | $\approx P_{PcsvOpen}$ | $\approx P_{PcsvClose}$ |
| CONNECTION PORTION BETWEEN EJECTOR AND AIR CHARGE LINE | $\approx P_{atm}$ | $\geq P_{atm}$ |
| RECIRCULATION LINE | $\approx P_{atm}$ | $\approx P_{atm}$ |

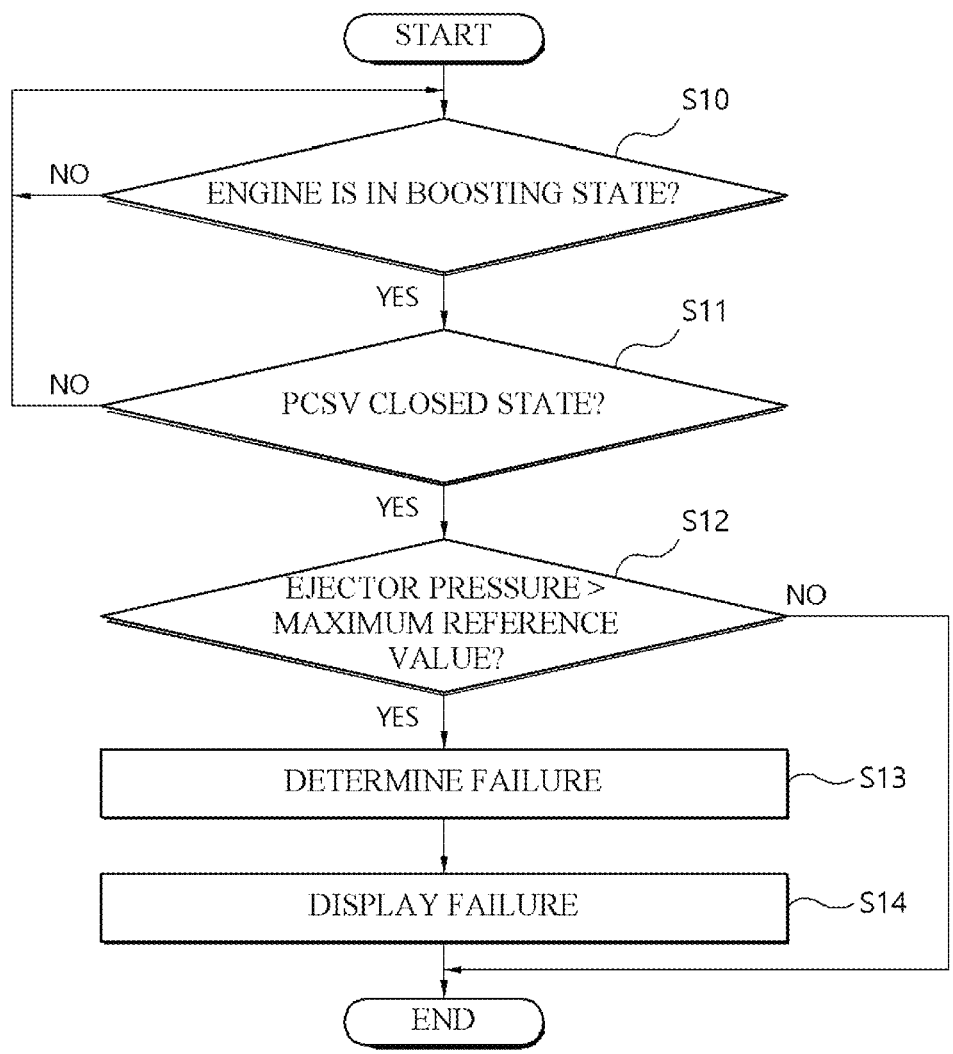

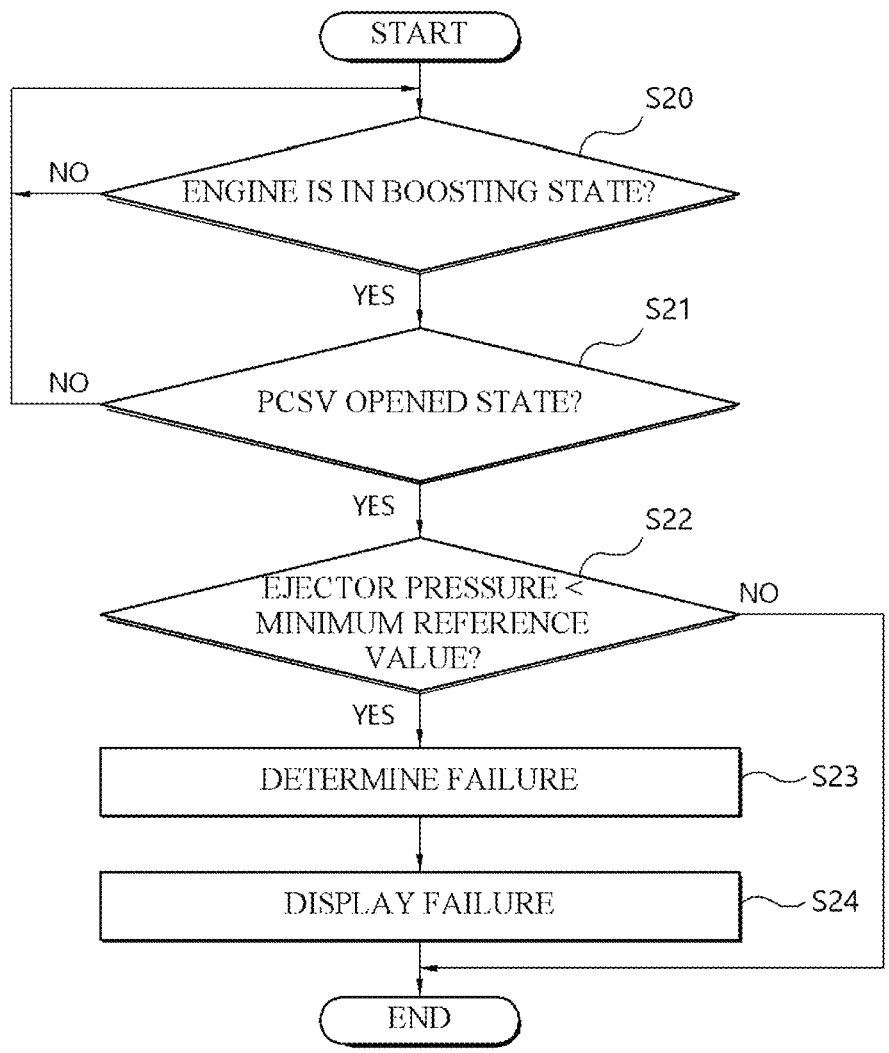

FAILURE DIAGNOSIS METHOD AND SYSTEM OF DUAL PURGE SYSTEM

CROSS-REFERENCE TO RELATED APPLICATION

The present application claims priority to Korean Patent Application No. 10-2021-0061913, filed on May 13, 2021, the entire contents of which is incorporated herein for all purposes by this reference.

BACKGROUND OF THE INVENTION

Field of the Invention

The present invention relates to a failure diagnosis method and system of a dual purge system, and more specifically, to a failure diagnosis method and system of a dual purge system using a pressure in a negative-pressure formation device configured to purge an evaporation gas by forming a negative pressure in a boosting region where the evaporation gas may not be purged by an engine negative pressure.

Description of Related Art

To achieve improvement in fuel efficiency while increasing the output and torque of a vehicle, a turbocharger is mounted on the vehicle. When a charger mounted on an exhaust pipe is rotated by an evaporation gas, the turbocharger is a device in which a compressor mounted on an intake pipe dependently rotates and compresses the intake air. Since the intake air is compressed by the turbocharger, a larger amount of air may be supercharged into a combustion chamber, and a larger amount of fuel may be combusted.

Meanwhile, to prevent the evaporation gas evaporated by a fuel tank from being discharged to the atmosphere, a single purge system is conventionally applied to a vehicle. The evaporation gas in the single purge system is collected in a canister. Furthermore, the canister is connected to an intake pipe through a purge line, and the evaporation gas collected in the canister by an intake air pressure generated by the intake pipe is moved to the intake pipe through the purge line to flow into an engine.

However, if the turbocharger is operated, a pressure equal to or greater than the atmosphere pressure occurs in the intake pipe such that it is difficult to generate the intake air pressure sufficient for the intake pipe with only the negative pressure generated by the engine, and rather, the intake air may be moved from the intake pipe to the purge line.

Generally, the dual purge system purges the evaporation gas by the intake air pressure as in the single purge system in the normal operation region, and forcibly purges the evaporation gas using the separate negative pressure formation device such as an ejector in the boosting region where it is difficult to generate the intake air pressure.

Meanwhile, the North American OBD regulation prescribes to monitor a failure of a purge system, and forces to monitor whether the purge to the engine is impossible and whether there occurs leak in the system.

However, whether the purge to the engine is impossible even with respect to a vehicle using the dual purge system may be likewise monitored by the OBD regulation, and as described above, since the dual purge system adds additional components, such as a negative pressure formation device, a negative pressure line, and a recirculation line, to the conventional single purge system, and adds the purge function in the boosting region thereto, there is the demand for a new diagnosis method and system for monitoring whether a failure occurs in the added components in addition to the conventional diagnosis method.

In this regard, generally there is a technology of determining the failure in the engine negative pressure formation line by comparing a pressure change value determined based on a fuel tank pressure difference with the reference value.

However, if the fuel tank pressure is used for diagnosing the failure, the diagnosis result may be affected by related components or environmental conditions such as fuel evaporation pressure and whether the canister close valve (CCV) operates such that there is a problem in that it is difficult to determine whether there is abnormality in only the purge system regardless of other conditions.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a diagnosis method and a diagnosis system, which may diagnose whether the purge in a boosting region where it is difficult to conduct diagnosis in the conventional failure diagnosis method of the single purge system is impossible, and determine whether there is abnormality in only a purge system regardless of external environmental conditions.

A failure diagnosis method of a dual purge system according to various exemplary embodiments of the present invention for achieving the object provided with a primary purge line connecting a purge valve to a supercharging line on a downstream side of a throttle valve, and having a purge gas flowing due to an intake pressure of an intake system, a secondary purge line connecting the purge valve to a negative pressure formation device provided in an air charge line on an upstream of a turbocharger, and having the purge gas flowing due to a forced negative pressure formed by the negative pressure formation device upon boosting the turbocharger, and a recirculation line connecting a rear end portion of the turbocharger to the negative pressure formation device to recirculate a supercharged air to a front end portion of the turbocharger, includes measuring, by a controller, a pressure formed by the negative pressure formation device in an opened state or a closed state of the purge valve; diagnosing, by the controller, a failure to determine whether a closed stuck failure or opened stuck failure occurs in a line forming the dual purge system by comparing the pressure measured in the measuring of the pressure with a predetermined reference value; and warning a failure situation when the controller concludes that the failure occurs in the diagnosing of the failure according to a result of the diagnosing.

The reference value may be set as a value determined according to a boosting pressure of the turbocharger.

The measuring of the pressure includes measuring the pressure in the negative pressure formation device in a state where the purge valve is opened, and the diagnosing of the failure including determining that the closed stuck failure occurs in the secondary purge line if the controller determines that the measured pressure is smaller than a predetermined minimum reference value.

Alternatively, the measuring of the pressure may measure the pressure formed by the negative pressure formation device in a state where the purge valve is closed, and the diagnosing of the failure may determine that the opened stuck failure or the closed stuck failure occurs in the line forming the dual purge system if the measured pressure is greater than a predetermined maximum reference value.

To determine a failure place and a failure item more specifically, the diagnosing of the failure may determine that the closed stuck failure occurs in a connection portion connecting the negative pressure formation device to the air charge line if the measured pressure is equal to an atmospheres pressure or greater than the atmospheres pressure.

Alternatively, the diagnosing of the failure may determine that the opened stuck failure occurs in a connection portion connecting the recirculation line or the negative pressure formation device to the air charge line or that the closed stuck failure occurs in the recirculation line, if the measured pressure exists between an atmosphere pressure and a predetermined first reference value smaller than the atmosphere pressure.

Alternatively, the diagnosing of the failure may determine that the opened stuck failure occurs in the secondary purge line if the measured pressure is greater than the predetermined maximum reference value and smaller than the predetermined first reference value.

The failure diagnosis method of the dual purge system may further include arbitrarily driving the purge valve such that the purge valve is closed or opened before performing the measuring of the pressure if the state of the purge valve is not in a state of being suitable for performing the diagnosis method to be executed.

Furthermore, to prevent misdiagnosis, the failure diagnosis method of the dual purge system may further include stopping the failure diagnosing the failure in the dual purge system in response to tipping out of an accelerator pedal.

Furthermore, a first failure diagnosing step which performs the measuring of the pressure and the diagnosing of the failure after controlling the purge valve such that the purge valve is in one of the closed state or the opened state and a second failure diagnosing step which performs the measuring of the pressure and the diagnosing of the failure after controlling the purge valve such that the purge valve is in a state different from the state of being controlled in the first failure diagnosis step of the state where the purge valve is closed or the state where the purge valve is opened are sequentially performed, and if it is determined that all of the diagnosis results in the first failure diagnosis step and the second failure diagnosis step are normal, it may also be determined that the dual purge system is normal.

A failure diagnosis system according to various exemplary embodiments of the present invention for achieving the object provided with a primary purge line connecting a purge valve to a supercharging line on a downstream side of a throttle valve, and having a purge gas flowing due to a negative of an engine; a secondary purge line connecting the purge valve to a negative pressure formation device provided in an air charge line on an upstream of a turbocharger, and having the purge gas flowing due to a forced negative pressure formed by the negative pressure formation device upon boosting the turbocharger; and a recirculation line connecting a rear end portion of the turbocharger to the negative pressure formation device to recirculate a supercharged air to a front end portion of the turbocharger, the failure diagnosis system includes a pressure sensor unit provided in the negative pressure formation device to detect the pressure in the negative pressure formation device; a controller configured to determine whether a closed stuck failure or an opened stuck failure occurs in a line forming the dual purge system by comparing the pressure in the negative pressure formation device measured by the pressure sensor unit with a predetermined reference value; and an output unit configured to output a display warning a failure situation if it is determined that the failure occurs in the dual purge system by the controller.

The controller may arbitrarily control the purge valve so that the purge valve is in a fully closed state or in a fully opened state for determining the closed stuck failure or the opened stuck failure.

The present invention may diagnose whether there is a failure in the dual purge system in the boosting region where it is difficult to determine whether there is a failure in the conventional diagnosis method of the single purge system using the pressure in the negative pressure formation device when the purge valve is in the specific state.

Furthermore, by notifying the driver of the specific diagnosis result related to the failure occurrence place and the failure occurrence content upon failure occurrence diagnosis, it is possible to allow the driver to easily confirm the place where substitution or repair is required, decreasing the time or the cost required for repair.

Furthermore, it is possible to perform the failure diagnosis in the method for monitoring the internal pressure in the negative pressure formation device in two states where the purge valve is fully closed or fully opened, detecting the failure in the relatively simple method. Furthermore, it is possible to prevent the distortion of the diagnosis result due to the external conditions such as other components other than the dual purge system or the fuel characteristics, compared to the diagnosis method using the fuel tank pressure sensor.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 5 is a flowchart illustrating an exemplary embodiment of a failure diagnosis method of the dual purge system according to various exemplary embodiments of the present invention.

FIG. 6 is a flowchart illustrating another exemplary embodiment of the failure diagnosis method of the dual purge system according to various exemplary embodiments of the present invention.

Figure 1:
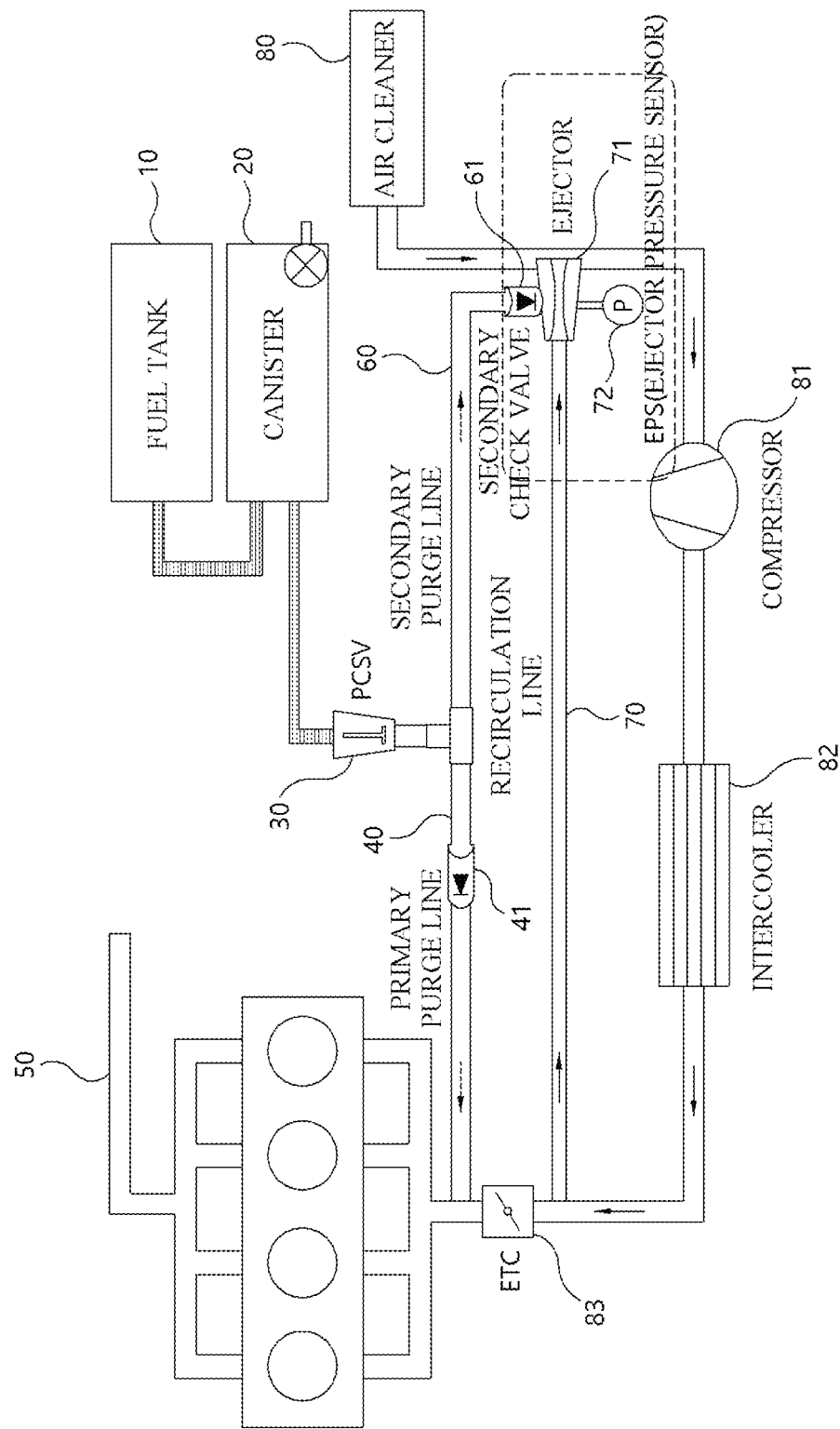
FIG. 1 is a schematic diagram illustrating the entire configuration of a dual purge system for a vehicle to which a diagnosis method and a diagnosis system according to various exemplary embodiments of the present invention are applied.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, exemplary embodiments of the present invention will be descried in detail with reference to the accompanying drawings.

FIG. 1 is a schematic diagram illustrating the entire configuration of a dual purge system for a vehicle to which a diagnosis method and a diagnosis system according to various exemplary embodiments of the present invention are applied.

In a vehicle provided with a turbocharger, as illustrated in FIG. 1, an outside air flowing into an air charge line through an air cleaner 80 is compressed by a compressor 81 of the turbocharger, cooled by an intercooler 82, and then flows into an engine 50 through a supercharging line. Furthermore, a flow rate of the compressed air flowing into the engine 50 is controlled by a throttle valve 83.

A fuel tank 10 is configured to store a fuel of a vehicle, and an evaporation gas is generated as the fuel stored in the fuel tank 10 is vaporized.

A canister 20 collects the evaporation gas generated by the fuel tank 10, for example, by activated-carbon or the like.

A purge valve 30 is provided between a purge line and the canister 20 such that the evaporation gas collected by the canister 20 may be purged to the engine 50 through a primary purge line 40 or a secondary purge line 60 to be described later. The purge valve 30 may actively adjust a flow rate of the evaporation gas flowing into each purge line by adjusting an opening time point and an operation amount through a duty control.

The primary purge line 40 is branched from the purge valve 30 and connected to the supercharging line of an intake system connecting the engine 50 to a downstream side of the throttle valve 83. Therefore, if the purge valve 30 is opened according to a control duty signal of a control unit 100 to be described later, the evaporation gas collected by the canister 20 may be purged to the engine 50 by a suction force according to the negative pressure generated upon driving the engine 50.

The secondary purge line 60 is branched from the purge valve 30 and connected to the negative pressure formation device 71 connected to the air charge line at the upstream side of the compressor 81. Therefore, if the purge valve 30 is opened according to the control duty signal of the control unit 100, the evaporation gas collected in the canister 20 by the suction force due to the negative pressure formed by the negative pressure formation device 71 to be described later may be purged to the engine 50 through the air charge line connected to the air charge line.

A recirculation line 70 is branched from the supercharging line on an upstream side of the throttle valve 83, and connected to the aforementioned negative pressure formation device 71 to recirculate the air compressed by the compressor 81 of the turbocharger to a front end portion of the compressor 81.

The negative pressure formation device 71 is a device configured to provide a suction force such that the evaporation gas collected by the canister 20 may be purged by forming a negative pressure, and as illustrated in FIG. 1, an ejector 71 may be used as the negative pressure formation device 71. The ejector 71 utilizes the high-pressure supercharged air flowing into through the recirculation line 70 as a motive fluid, and the evaporation gas flowing into from the secondary purge line 60 using the pressure energy of the supercharged air may be transported to the air charge line.

Figures 3, 4:
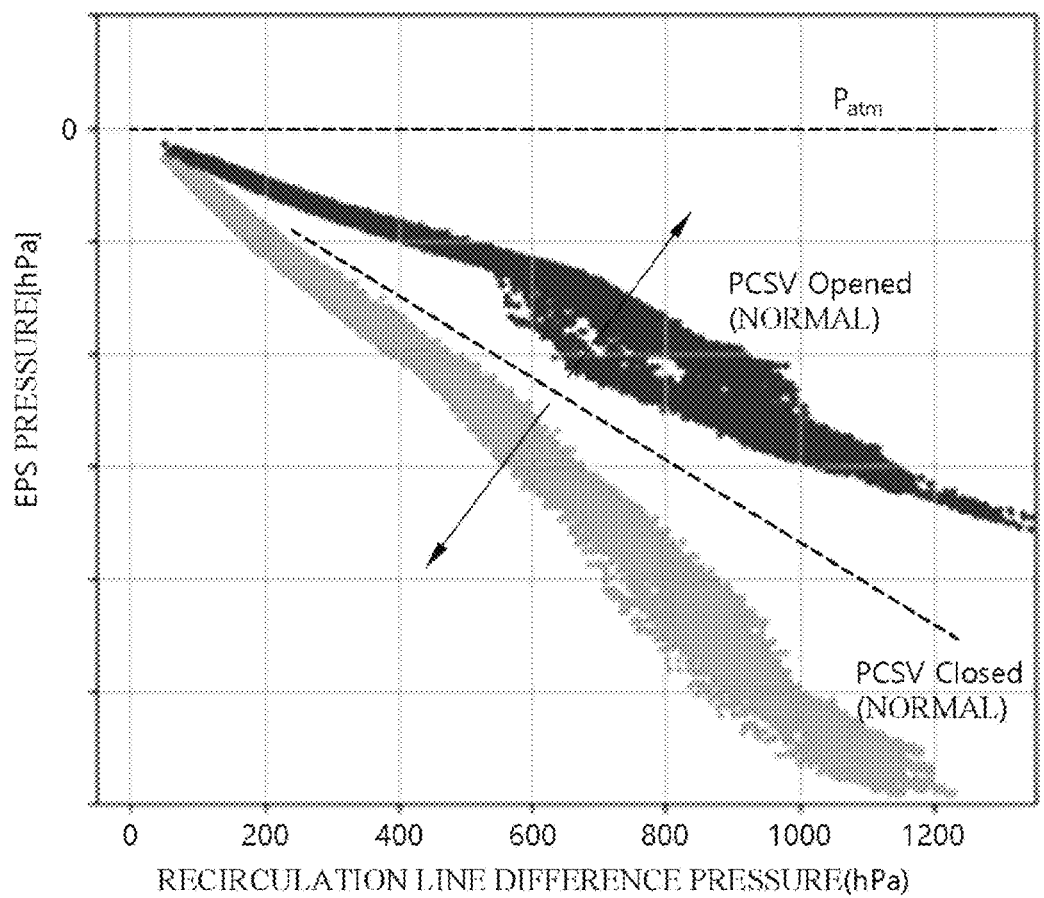
FIG. 3 is a graph illustrating a change in an ejector pressure according to a difference pressure of a recirculation line.
FIG. 4 is a table illustrating the magnitude of the ejector pressure for each failure item.

An ejector pressure sensor 72 is mounted on the ejector 71 to measure a pressure of the ejector 71. As illustrated in FIG. 3, the pressure of the ejector 71 measured by the ejector pressure sensor 72 represents a smaller value as the negative pressure generated by the ejector 71 increases, and represents the level of the atmosphere pressure if the negative pressure is not generated by the ejector 71.

Furthermore, the primary purge line 40 and the secondary purge line 60 are provided with a first check valve 41 and a second check valve 61, respectively, to prevent the evaporation gas from backflowing.

As described above, in the dual purge system to which the diagnosis method and the diagnosis system according to various exemplary embodiments of the present invention are applied, in the normal operation region where the turbocharge does not operate, the evaporation gas detached from the canister 20 and flowing into the purge valve 30 is purged to the engine 50 from the primary purge line by the suction force according to the negative pressure generated by the engine 50.

However, in the boosting region where the turbocharger operates, it is difficult to purge the evaporation gas by the suction force in the supercharging line because the pressure in the supercharging line is high. In the dual purge system, in the boosting region, the evaporation gas detached from the canister 20 and flowing into the purge valve 30 may be purged to the engine 50 from the secondary purge line by the negative pressure generated by the negative pressure formation device 71 using the supercharged air recirculated through the recirculation line 70 as the motive fluid.

Figure 2:
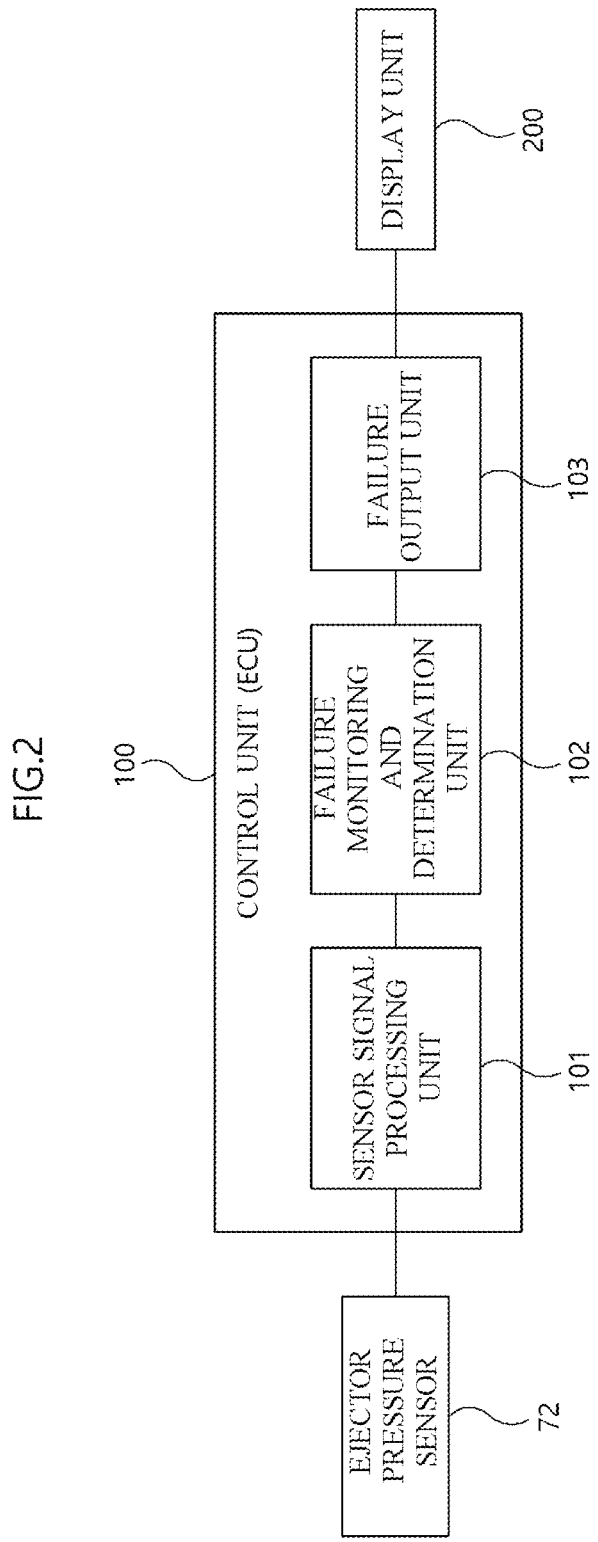
FIG. 2 is a diagram illustrating a configuration of a system for diagnosing a failure of the dual purge system according to various exemplary embodiments of the present invention.

FIG. 2 is a diagram illustrating a configuration of a system for diagnosing a failure of the dual purge system according to various exemplary embodiments of the present invention. Hereinafter, a failure diagnosis system of the dual purge system according to various exemplary embodiments of the present invention will be described in detail with reference to FIG. 2.

As illustrated in FIG. 2, the failure diagnosis system of the dual purge system according to various exemplary embodiments of the present invention includes the aforementioned ejector pressure sensor 72, a control unit (ECU) 100, and a display unit 200.

As described above, the ejector pressure sensor 72 measures the pressure of the ejector 71 in a state where the purge valve 30 is closed or opened.

The control unit 100 is provided with a sensor signal processing unit 101, a failure monitoring and determination unit 102, and a failure output unit 103.

The sensor signal processing unit 101 of the control unit 100 converts an ejector pressure sensor signal input by the ejector pressure sensor 72 into a digital signal, and removes noise through a process of separating and amplifying a frequency component by a predetermined band filter.

The failure monitoring and determination unit 102 determines whether there occurs a failure in the dual purge system by comparing an ejector pressure value, which is signal-processed by the sensor signal processing unit 101, with a pre-stored predetermined reference value.

As described above, the ejector 71 utilizes the high-pressure supercharged air flowing into through the recirculation line 70 in the boosting region as the motive fluid, and transports the evaporation gas flowing into the secondary purge line to the air charge line using the pressure energy of the supercharged air. Therefore, as illustrated in FIG. 3, as a difference pressure of the supercharged air passing through the recirculation line increases, the negative pressure generated by the ejector 71 increases such that the pressure of the ejector 71 is decreased compared to the atmosphere pressure.

However, when the purge valve 30 is in a fully closed state upon operation in the boosting region, the supply of the evaporation gas through the secondary purge line 60 from the purge valve 30 is stopped such that as illustrated in FIG. 3, a larger negative pressure is formed than in the state where the purge valve 30 is opened (i.e., the pressure of the ejector 71 is further decreased).

Therefore, if a sufficient negative pressure is not formed by the ejector 71 or the magnitude of the negative pressure formed is small even if the purge valve 30 is in a fully closed state, it may be estimated that there occurs a failure in the dual purge system. Therefore, it may be determined that a failure occurs in the dual purge system by comparing the pressure value of the ejector 71 in the state where the purge valve 30 is fully closed with a predetermined reference value.

Furthermore, likewise, even if the negative pressure with the same magnitude as in the state where the purge valve 30 is fully closed is generated by the ejector 71 even if the purge valve 30 is in the fully opened state, it may be estimated that a failure occurs in the dual purge system. Therefore, it may also be determined that the failure occurs in the dual purge system by comparing the pressure value of the ejector 71 with the predetermined reference value in the state where the purge valve 30 is fully opened. Details of the method for determining the occurrence of the failure in the control unit 100 will be descried later with reference to FIG. 5 and FIG. 6.

If the failure monitoring and determination unit 102 determines that the failure occurs in the dual purge system, the failure output unit 103 transmits an output signal, which allows the display unit 200 to warn a driver, to the display unit 200.

The control unit 100 may be a controller implemented in a form of a computer provided in the vehicle. In the instant case, the control unit 100 may also be realized by being executed by recording a program for implementing the control function in a computer readable recording medium, and reading the program recorded in the recording medium into a computer system. Furthermore, the [computer system] mentioned here is a computer system embedded in the vehicle, and includes hardware such as OS or peripheral devices. Furthermore, the [computer readable recording medium] refers to a memory device such as a portable medium such as a flexible disc, an optical magnetic disc, a ROM, or a CD-ROM, or a hard disc embedded in the computer system. Furthermore, the [computer readable recording medium] also includes the one dynamically maintaining the program for a short time, such as a communication line in the case of transmitting the program through a communication line such as a network such as Internet or a telephone line, or the one maintaining the program for a certain time, such as a volatile memory in the computer system becoming a server or a client in that case. Furthermore, the program is a program for realizing a part of the aforementioned function, and also a program configured for realizing the aforementioned function in a combination with the program already recorded in the computer system.

The display unit 200 as a means for warning the driver of the fact that the failure occurs in the dual purge system may be preferably a cluster for a vehicle. However, the display unit 200 is not limited to a visual display device, and may also be a speaker for warning the driver by generating voice or warning sound.

FIG. 5 is a flowchart illustrating an exemplary embodiment of the failure diagnosis method performed in the case where the purge valve 30 is in the closed state, and FIG. 6 is a flowchart illustrating an exemplary embodiment of the failure diagnosis method performed in the case where the purge valve 30 is in the opened state. Hereinafter, an exemplary embodiment of the failure diagnosis method according to various exemplary embodiments of the present invention will be described in more detail with reference to FIG. 5 and FIG. 6.

First, the exemplary embodiment of the failure diagnosis method performed in the case where the purge valve 30 is in the closed state will be described with reference to FIG. 5.

As illustrated in FIG. 5, first, the control unit 100 determines whether the engine 50 is in the boosting state (S10). Whether it is in the boosting state is determined by measuring revolutions per minute (RPM) of the compressor 81 or a turbine, or an air pressure of the supercharged air or the like, or it is determined that the engine 50 is in the boosting state in the case of transmitting a driving signal to the turbocharger from the control unit 100. When the vehicle does not exist in the boosting operation region, the supercharged air for forming the sufficient negative pressure by the ejector 71 may not be supplied such that it is difficult to accurately perform the failure diagnosis. Therefore, the failure diagnosis method according to various exemplary embodiments of the present invention perform diagnosis only when the vehicle exists in the boosting operation region.

If it is determined that the engine 50 is in the boosting state, the control unit 100 determines whether the purge valve 30 is in the closed state (S11). If the purge valve 30 is not in the closed state, the control unit 100 may transmit a duty signal in a direction in which the purge valve 30 is closed to arbitrarily drive the purge valve 30. However, if the time during which the purge valve 300 is closed sufficiently exists according to the operation region, the diagnosis may be performed in a time zone during which the purge valve 30 is closed without having to arbitrarily drive the purge valve 30. Furthermore, to perform the accurate diagnosis, the diagnosis is preferably performed in a state where the opening of the purge valve 30 is 0%, that is, the purge valve 30 is in the fully closed state.

If it is determined that the purge valve 30 is in the closed state, the control unit 100 compares the measurement value of the ejector pressure sensor 72 with the predetermined reference value (S12), and determines whether there is the failure according to the comparison result (S13).

As described above, if the purge valve 30 is in the fully closed state, a larger negative pressure is formed in the ejector 71, as illustrated in FIG. 3, the pressure of the ejector 71 is smaller than in the state where the purge valve 30 is opened. However, if the negative pressure is not generated or insufficient even if the purge valve 30 is in the fully closed state, the pressure of the ejector 71 is greater than in the state where the purge valve 30 is opened. Therefore, the control unit 100 determines that opening stuck or closing stuck failure occurs in the line forming the dual purge system in S13 if the measured pressure is greater than the predetermined maximum reference value by comparing the pressure measured in S12 with the predetermined maximum reference value (i.e., the maximum pressure value which is available in the case where the purge valve 30 is in the closed state). Meanwhile, as illustrated in FIG. 3, when the purge valve 30 is in the closed state, the pressure of the normal ejector 71 varies according to the difference pressure operated between both end portions of the recirculation line 70. Therefore, the predetermined maximum reference value is preferably variously set according to the difference pressure value obtained by the pressure sensor or the like provided in the recirculation line 70.

Meanwhile, referring to the graph illustrated in FIG. 4, if the measured pressure is greater than the maximum reference value, the magnitude of the measured pressure varies according to the failure occurrence place and the failure content.

For example, if the closing stuck failure, such as clogging due to foreign matters in the connection portion connecting the ejector 71 to the air charge line, occurs, a negative pressure much greater than the normal negative pressure is generated in the ejector 71, becoming the atmosphere pressure or more. Therefore, if the corresponding pressure is the atmosphere pressure or more by comparing the pressure measured in S12 with the atmosphere pressure, it is determined in S13 that the closing stuck failure, such as clogging due to foreign matters in the connection portion connecting the ejector 71 to the air charge line, occurs.

Furthermore, if the closing stuck failure, such as clogging due to the existence of foreign matters or the like in a hose forming the recirculation line 70, occurs, sufficient motive fluid may not be supplied to the ejector 71 such that the ejector 71 may not form a sufficient amount of negative pressure. Therefore, the ejector pressure appears to be as the pressure close to the atmosphere pressure. Furthermore, one end portion of the ejector 71 is in a state of being exposed to the atmosphere pressure even when the opening stuck failure, such as release of the hose forming the recirculation line 70, occurs such that even in the instant case, the ejector pressure appears as the pressure close to the atmosphere pressure. Furthermore, one end portion of the ejector 71 is exposed to the atmosphere pressure even when the opening stuck failure, such as release of the hose forming the connection portion connecting the ejector 71 to the air charge line, occurs such that even in the instant case, the ejector pressure appears as the pressure close to the atmosphere pressure.

Therefore, if the corresponding pressure exists between the atmosphere pressure and a predetermined first reference value smaller than the atmosphere pressure by comparing the pressure measured in S12 with the atmosphere pressure, it is determined in S13 that the closing stuck failure, such as clogging due to foreign matters in the connection portion connecting the ejector 71 to the air charge line, occurs, the opening stuck failure, such as release of the hose forming the corresponding recirculation line, occurs, or the opening stuck failure in the connection portion connecting the ejector 71 to the air charge line occurs.

Meanwhile, if the opening stuck failure, such as release of the hose forming the secondary purge line 60, occurs, a certain degree of the negative pressure is formed by the supercharged air supplied through the recirculation line 70, but a smaller amount of negative pressure than in the state where the purge valve 30 is closed is formed. Therefore, the ejector pressure is greater than a normal pressure ($P_{pcsvClose}$) in the state where the purge valve 30 is fully closed. Therefore, if the pressure measured in S12 is greater than the predetermined maximum reference value (the maximum value of the pressure in the state where the purge valve is closed) and smaller than the aforementioned first reference value, it is determined that the opening stuck failure occurs in the second purge line.

It is determined in S13 that the failure occurs in the dual purge system, the failure output unit 103 of the control unit 100 transmits the output signal to the display unit 200 to allow the display unit 200 to warn the driver of the failure content. Upon warning, the display unit 200 may also warn the fact that the abnormality occurs in the dual purge system simply using voice information or visual information, but as described above, may display the place where the failure occurrence is estimated or the failure content on the cluster or the like. Furthermore, A failure code related to the failure content is stored in a maintenance code storage unit. In the instant case, when the driver recognizes the failure occurrence fact to visit an auto shop, a mechanic may read the failure code stored in the maintenance code storage unit through an ECU scanner to immediately confirm the failure occurrence place of the corresponding vehicle. Therefore, it is possible to immediately replace the problematic component without unnecessarily replacing other normal components, increasing the unnecessary cost or consuming the time due to mis-maintenance.

Unlike the exemplary embodiment illustrated in FIG. 5, FIG. 6 illustrates an exemplary embodiment of the failure diagnosis method performed in the case where the purge valve 30 is in the opened state.

As illustrated in FIG. 5, even in the exemplary embodiment illustrated in FIG. 6, first, the control unit 100 determines whether the engine 50 is in the boosting state (S20).

If it is determined that the engine 50 is in the boosting state, the control unit 100 determines whether the purge valve 30 is in the opened state (S21). If the purge valve 30 is not in the opened state, the control unit 100 may transmit the duty signal in the direction in which the purge valve 30 is opened to arbitrarily drive the purge valve 30. However, if the time during which the purge valve 30 is opened sufficiently exists according to the operation region, the diagnosis may be performed in a time zone during which the purge valve 30 is opened without having to arbitrarily drive the purge valve 30. Furthermore, to perform the accurate diagnosis, the diagnosis is preferably performed in a state where the opening of the purge valve 30 is 100%, that is, the purge valve 30 is in the fully opened state.

If it is determined that the purge valve 30 is in the opened state, the control unit 100 compares the measurement value of the ejector pressure sensor 72 with the predetermined reference value (S22) and determines whether there is the failure according to the comparison result (S23).

If the purge valve 30 is in the fully opened state, as illustrated in FIG. 3, an amount of evaporation gas flowing into from the secondary purge line 60 increases such that the magnitude of the negative pressure generated by the ejector 71 decreases. Therefore, a normal ejector pressure ($P_{pcsvOpen}$) in that state is greater than the normal pressure ($P_{pcsvClose}$) in the state where the purge valve 30 is fully closed.

However, if the clogged stuck failure in which the inside of the hose forming the secondary purge line 60 is clogged by foreign matters occurs, the evaporation gas supply from the secondary purge line 60 is stopped such that the same negative pressure as in the state where the purge valve 30 is fully closed is formed by the ejector 71. In other words, the ejector pressure is similar to the normal pressure ($P_{pcsvClose}$) in the state where the purge valve 30 is fully closed. Therefore, if the pressure measured in step S22 is smaller than the predetermined minimum reference value (the minimum value of the pressure in the state where the purge valve is opened), it is determined that the closed stuck failure occurs in the second purge line (S23).

If it is determined in step S23 that the failure occurs in the dual purge system, as in step S13 of the exemplary embodiment illustrated in FIG. 5, the failure output unit 103 of the control unit 100 transmits the output signal to the display unit 200 to warn the driver of the failure content (S24).

The exemplary embodiment illustrated in FIG. 5 and the exemplary embodiment illustrated in FIG. 6 may also be performed in the case where the purge valve 30 is in the state of being fully opened or in the state of being fully closed, respectively, according to the operation region. Alternatively, the purge valve 30 is in the fully closed state or the control unit 100 arbitrarily controls the purge valve 30 to be in such a state and then diagnoses whether the failure occurs according to the diagnosis method illustrated in FIG. 5, and then the control unit 100 may arbitrarily control the purge valve 30 to be in the fully opened state, and diagnose whether the failure occurs according to the diagnosis method illustrated in FIG. 6. In the instant case, if it is determined to be normal in any case as the diagnosis results using the diagnosis methods illustrated in FIG. 5 and FIG. 6, it may be determined that the dual purge system is normal. Furthermore, conversely, the control unit 100 diagnoses whether the failure occurs according to the diagnosis method illustrated in FIG. 6 in the state where the purge valve 30 is fully opened, and then the control unit 100 may arbitrarily control the purge valve 30 such that the purge valve 30 is in the fully closed state, and diagnose whether the failure occurs according to the diagnosis method illustrated in FIG. 5.

Meanwhile, in a case where the driver tips out an accelerator pedal during operation in the boosting region or the like, the pressure of the intake system rapidly decreases. Therefore, in the instant case, a part of the evaporation gas passing through the purge valve 30 passes through the primary purge line 40 by the negative pressure generated by the engine 50. Therefore, if it is determined whether the failure occurs using the diagnosis method, there is a high possibility of misdiagnosis such that the control unit 100 stops the failure diagnosis.

As described above, the failure diagnosis method according to various exemplary embodiments of the present invention may determine whether the failure occurs in the component related to the secondary purge line in the dual purge system in the simple method for measuring the pressure of the ejector 71 in the state where the purge valve 30 is closed or opened. Meanwhile, whether the failure occurs in the component related to the primary purge line may be performed according to the conventional failure diagnosis method of the single purge system.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A failure diagnosis method of a dual purge system provided with a primary purge line connecting a purge valve to a supercharging line on a downstream side of a throttle valve, and having a purge gas flowing due to an intake pressure of an intake system; a secondary purge line connecting the purge valve to a negative pressure formation device provided in an air charge line on an upstream of a turbocharger, and having the purge gas flowing due to a forced negative pressure formed by the negative pressure formation device upon boosting the turbocharger; and a recirculation line connecting a downstream portion of the turbocharger to the negative pressure formation device to recirculate a supercharged air to an upstream portion of the turbocharger, the method comprising:

measuring, by a controller via a pressure sensor, a pressure in the negative pressure formation device in an opened state of the purge valve or a closed state of the purge valve;

diagnosing, by the controller, a failure by determining whether a closed stuck failure or opened stuck failure occurs in the secondary purge line or the recirculation line forming the dual purge system by comparing the pressure measured in the measuring of the pressure with a predetermined reference value; and warning a failure situation when the controller concludes that the failure occurs in the diagnosing of the failure according to a result of the diagnosing, wherein the predetermined reference value is a value determined according to a boosting pressure of the turbocharger.

2. The failure diagnosis method of claim 1, wherein the measuring of the pressure includes measuring the pressure in the negative pressure formation device in a state where the purge valve is opened, and wherein the diagnosing of the failure includes determining that the closed stuck failure occurs in the secondary purge line if the controller determines that the measured pressure is smaller than a predetermined minimum reference value.

3. The failure diagnosis method of claim 1, wherein the measuring of the pressure includes measuring the pressure in the negative pressure formation device in a state where the purge valve is closed, and wherein the diagnosing of the failure includes determining that the opened stuck failure or the closed stuck failure occurs in the secondary purge line or the recirculation line forming the dual purge system if the measured pressure is greater than a predetermined maximum reference value.

4. The failure diagnosis method of claim 3, wherein the diagnosing of the failure includes determining that the closed stuck failure occurs in a connection portion connecting the negative pressure formation device to the air charge line if the measured pressure is equal to an atmospheres pressure or greater than the atmospheres pressure.

5. The failure diagnosis method of claim 3, wherein the diagnosing of the failure includes determining that the opened stuck failure occurs in a connection portion connecting the recirculation line or the negative pressure formation device to the air charge line or that the closed stuck failure occurs in the recirculation line, if the measured pressure is between an atmosphere pressure and a predetermined first reference value smaller than the atmosphere pressure.

6. The failure diagnosis method of claim 5, wherein the diagnosing of the failure includes determining that the opened stuck failure occurs in the secondary purge line if the measured pressure is greater than the predetermined maximum reference value and smaller than the predetermined first reference value.

7. The failure diagnosis method of claim 1, further including:
arbitrarily driving the purge valve such that the purge valve is closed or opened before performing the measuring of the pressure.

8. The failure diagnosis method of claim 1, further including:
stopping the diagnosing the failure in the dual purge system in response to tipping out of an accelerator pedal.

9. The failure diagnosis method of claim 1, further including:
a first failure diagnosing step which performs the measuring of the pressure and the diagnosing of the failure after controlling the purge valve such that the purge valve is in one of the closed state or the opened state; and
a second failure diagnosing step which performs the measuring of the pressure and the diagnosing of the failure after controlling the purge valve such that the purge valve is in a state different from a state of being controlled in the first failure diagnosis step of a state where the purge valve is closed or a state where the purge valve is opened are sequentially performed, and
wherein if all of the diagnosis results in the first failure diagnosis step and the second failure diagnosis step are normal, the controller concludes that the dual purge system is normal.

10. A failure diagnosis system of a dual purge system provided with a primary purge line connecting a purge valve to a supercharging line on a downstream side of a throttle valve, and having a purge gas flowing due to a negative pressure of an engine; a secondary purge line connecting the purge valve to a negative pressure formation device provided in an air charge line on an upstream of a turbocharger, and having the purge gas flowing due to a forced negative pressure formed by the negative pressure formation device upon boosting the turbocharger; and a recirculation line connecting a downstream portion of the turbocharger to the negative pressure formation device to recirculate a supercharged air to an upstream portion of the turbocharger, the failure diagnosis system of the dual purge system comprising:
a pressure sensor unit provided in the negative pressure formation device to detect a pressure in the negative pressure formation device;
a controller configured to determine whether a closed stuck failure or an opened stuck failure occurs in the secondary purge line or the recirculation line forming the dual purge system by comparing the pressure in the negative pressure formation device measured by the pressure sensor unit with a predetermined reference value; and
an output unit configured to output a display warning a failure situation when the controller concludes that the closed stuck failure or the opened stuck failure occurs in the dual purge system,
wherein the predetermined reference value is a value determined according to a boosting pressure of the turbocharger.

11. The failure diagnosis system of the dual purge system of claim 10,
wherein the controller is configured to arbitrarily control the purge valve so that the purge valve is in a fully closed state or in a fully opened state for determining the closed stuck failure or the opened stuck failure.

12. The failure diagnosis system of the dual purge system of claim 10,
wherein the controller is configured to measure the pressure in the negative pressure formation device in a state where the purge valve is opened, and
wherein the controller concludes that the closed stuck failure occurs in the secondary purge line when the controller determines that the measured pressure is smaller than a predetermined minimum reference value.

13. The failure diagnosis system of the dual purge system of claim 10,
wherein the controller is configured to measure the pressure in the negative pressure formation device in a state where the purge valve is closed, and
wherein the controller concludes that the opened stuck failure or the closed stuck failure occurs in the secondary purge line or the recirculation line forming the dual purge system when the controller determines that the measured pressure is greater than a predetermined maximum reference value.

14. The failure diagnosis system of the dual purge system of claim 13,
wherein the controller is configured to conclude that the closed stuck failure occurs in a connection portion connecting the negative pressure formation device to the air charge line when the controller determines that the measured pressure is equal to an atmospheres pressure or greater than the atmospheres pressure.

15. The failure diagnosis system of the dual purge system of claim 13,
wherein the controller is configured to conclude that the opened stuck failure occurs in a connection portion connecting the recirculation line or the negative pressure formation device to the air charge line or that the closed stuck failure occurs in the recirculation line, when the controller determines that the measured pressure is between an atmosphere pressure and a predetermined first reference value smaller than the atmosphere pressure.

16. The failure diagnosis system of the dual purge system of claim 15,
wherein the controller is configured to conclude that the opened stuck failure occurs in the secondary purge line when the controller determines that the measured pressure is greater than the predetermined maximum reference value and smaller than the predetermined first reference value.

\* \* \* \* \*